US011496485B2

(12) United States Patent
Clark

(10) Patent No.: US 11,496,485 B2
(45) Date of Patent: *Nov. 8, 2022

(54) TASK COMPLETION USING A BLOCKCHAIN NETWORK

(71) Applicant: Balanced Media Technology, LLC, McKinney, TX (US)

(72) Inventor: Corey Clark, Plano, TX (US)

(73) Assignee: Balanced Media Technology, LLC, McKinney, TX (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/301,491

(22) Filed: Apr. 5, 2021

(65) Prior Publication Data

US 2021/0226961 A1 Jul. 22, 2021

Related U.S. Application Data

(63) Continuation of application No. 16/529,478, filed on Aug. 1, 2019, now Pat. No. 10,972,479.

(Continued)

(51) Int. Cl.
*H04L 9/40* (2022.01)
*G06F 9/50* (2006.01)
*G06N 20/00* (2019.01)

(52) U.S. Cl.
CPC ............ *H04L 63/12* (2013.01); *G06F 9/5027* (2013.01); *G06F 9/5072* (2013.01); *G06N 20/00* (2019.01)

(58) Field of Classification Search
CPC ..... G06F 9/00; G06F 9/06; G06F 9/46; G06F 9/50; G06F 9/5027; G06F 9/5061;
(Continued)

(56) References Cited

U.S. PATENT DOCUMENTS 8,961,315 B1 * 2/2015 Adogla .................. G06Q 30/02
463/42
10,409,783 B1 * 9/2019 Miller ................... H04L 9/0637
(Continued)

OTHER PUBLICATIONS

Extended European Search Report dated Feb. 9, 2022 regarding Application No. 19845503.2, 6 pages.
(Continued)

*Primary Examiner* — Michael A Keller

(57) ABSTRACT

Methods, systems, and computer readable media for distributing tasks using a blockchain network. A method includes generating a task for completion via an interactive application and distributing, using the blockchain network, the task via a block in a blockchain associated with the blockchain network. The blockchain network includes a plurality of nodes and is accessible by a plurality of client devices associated with the interactive application. The method further includes receiving, from one or more of the client devices, data associated with results of processing the task via the interactive application and validating completion of the task based on the received data. Validating completion of the task may include receiving a set of user inputs from a set of the client devices, respectively, as to whether the task was completed and making a consensus determination as to whether the task was completed based on the received set of user inputs.

20 Claims, 3 Drawing Sheets

Related U.S. Application Data

(60) Provisional application No. 62/713,780, filed on Aug. 2, 2018.

(58) Field of Classification Search
CPC ....... G06F 9/5072; H04L 63/00; H04L 63/12; H04L 63/123; G06N 20/00
See application file for complete search history.

(56) References Cited

U.S. PATENT DOCUMENTS

| | | | |
|---|---|---|---|
| 2018/0101848 A1* | 4/2018 | Castagna | H04L 9/3236 |
| 2018/0109541 A1* | 4/2018 | Gleichauf | H04L 63/123 |
| 2018/0247234 A1* | 8/2018 | Crabtree | G06F 16/58 |
| 2018/0349201 A1* | 12/2018 | Clark | H04L 9/06 |
| 2019/0004789 A1* | 1/2019 | Mills | G06F 8/36 |
| 2019/0065709 A1* | 2/2019 | Salomon | G06F 21/44 |
| 2019/0228369 A1* | 7/2019 | Duval-Lgarta | G06Q 40/02 |

OTHER PUBLICATIONS

Li et al., "CrowdBC: A Blockchain-based Decentralized Framework for Crowdsourcing", International Association for Cryptologic Research, vol. 20180711:232125, Jul. 2018, 15 pages.

\* cited by examiner

TASK COMPLETION USING A BLOCKCHAIN NETWORK

CROSS-REFERENCE TO RELATED APPLICATIONS AND CLAIM OF PRIORITY

This application is a continuation of U.S. patent application Ser. No. 16/529,478 filed on Aug. 1, 2019, which claims priority to U.S. Provisional Patent Application No. 62/713,780, filed on Aug. 2, 2018. The content of the above-identified patent documents is incorporated herein by reference.

TECHNICAL FIELD

This disclosure relates generally to blockchain technologies. More specifically, this disclosure relates to using a blockchain in dispatching and validating tasks to and from a grid computing network.

BACKGROUND

As the demand for cloud-based computing and data processing of large data sets grows so too does the demand for computer resources. Grid or distributed computing is a solution for generating enormous computing power that can be used to process large datasets. Grid computing or distributed computing is a type of computing that utilizes a collection of computer resources from multiple locations (i.e., different, remotely located computing devices) to perform related tasks. Volunteer computing is a type of grid computing in which computer owners or users donate their computing resources (e.g., processing power and storage) to one or more projects.

A blockchain is a distributed list or database of records or blocks that are linked and secured using encryption. The blockchain is maintained by computer systems or nodes in the blockchain network (e.g., called miners) that each has their own copy of the blockchain. Records for which miners reach consensus on are added to the blockchain, which preserves the integrity of the blockchain.

BRIEF DESCRIPTION OF THE DRAWINGS

For a more complete understanding of the present disclosure and its advantages, reference is now made to the following description taken in conjunction with the accompanying drawings, in which like reference numerals represent like parts.

SUMMARY

Figure 1:
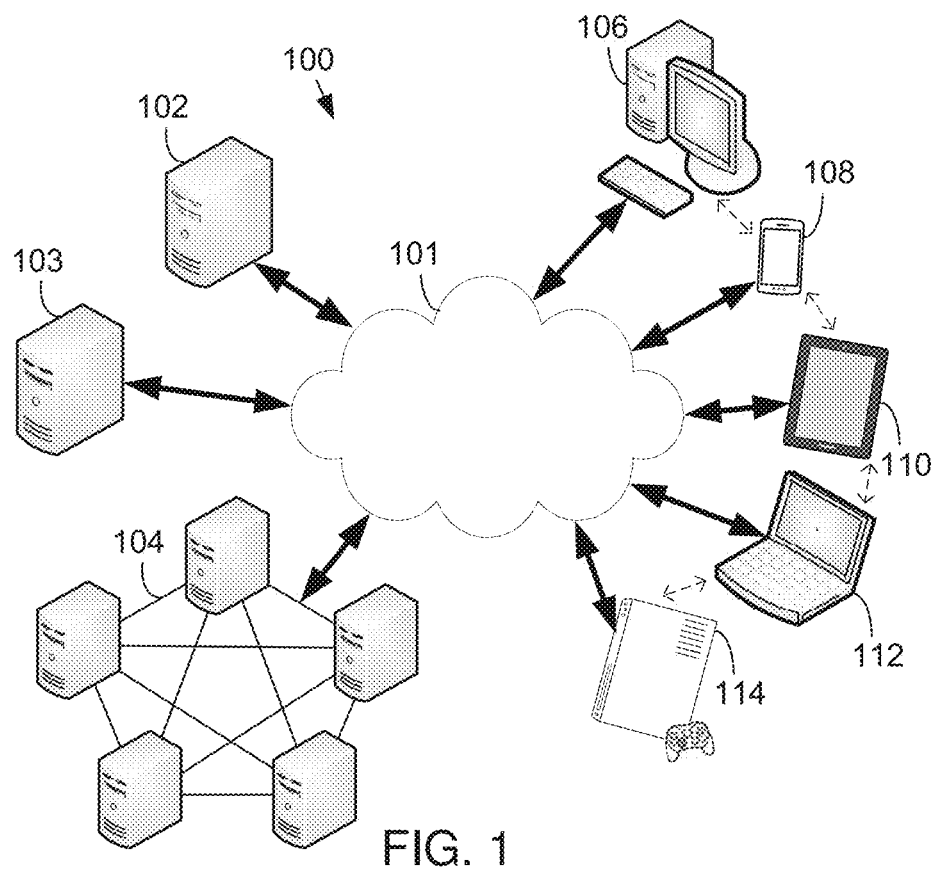
FIG. 1 illustrates an example networked system in which various embodiments of the present disclosure may be implemented.

Embodiments of the present disclosure provide for distributing tasks using a blockchain network.

In one embodiment, a method for distributing tasks using a blockchain network is provided. The method includes generating a task for completion via an interactive application and distributing, using the blockchain network, the task via a block in a blockchain associated with the blockchain network. The blockchain network includes a plurality of nodes and is accessible by a plurality of client devices associated with the interactive application. The method further includes receiving, from one or more of the client devices via one or more of the nodes in the blockchain network, data associated with results of processing the task via the interactive application and validating completion of the task based on the received data.

In another embodiment, a system for distributing tasks using a blockchain network is provided. The system includes a processor and a communication interface operably connected to the processor. The processor is configured to generate a task for completion via an interactive application and distribute, using the blockchain network, the task via a block in a blockchain associated with the blockchain network. The blockchain network includes a plurality of nodes and is accessible by a plurality of client devices associated with the interactive application. The communication interface is configured to receive, from one or more of the client devices via one or more of the nodes in the blockchain network, data associated with results of processing the task via the interactive application. Completion of the task is validated based on the received data.

In yet another embodiment, a non-transitory, computer-readable medium for distributing tasks using a blockchain network is provided. The computer-readable medium comprises program code that, when executed by a processor of a system, causes the system to generate a task for completion via an interactive application; distribute, using the blockchain network, the task via a block in a blockchain associated with the blockchain network; and receive, from one or more of the client devices via one or more of the nodes in the blockchain network, data associated with results of processing the task via the interactive application. The blockchain network includes a plurality of nodes and is accessible by a plurality of client devices associated with the interactive application. Completion of the task is validated based on the received data.

Other technical features may be readily apparent to one skilled in the art from the following figures, descriptions, and claims.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure provide for the inclusion, distribution, completion, validation, and/or compensation of "human" computational tasks (i.e., computing tasks that utilize inputs from a user of a client device such as those described in U.S. patent application Ser. No. 16/000,589 titled "Platform for Collaborative Processing of Computing Tasks," filed Jun. 5, 2018 (hereinafter "the '589 application") which is incorporated herein by reference) within an blockchain environment. In these embodiments, entities needing completion of these types of requests push the task to a blockchain. A platform (e.g., such as that described in the '589 application) that connects various client computing devices in a computing grid is utilized by the client devices to access the task from the blockchain for processing within a client application (e.g., an interactive application or game such as those described in the '589 application) by the client devices. The client devices then return the results of processing the task back to a miner in the blockchain network for delivery to the original requestor or other entity connected to the blockchain network via records posted to the blockchain. The client device processing the task can then receive credit via the blockchain e.g., in the form of cryptocurrency token or a crypto-utility token, for example by the execution of smart contracts stored in the blockchain. As a result, embodiments of the present disclosure provide for the distribution, completion, validation, and/or compensation of tasks in a manner secure reliable manner that can be free from fraud, downtime, or interference from outside parties.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 101, which facilitates communication between various components in the system 100. For example, the network 101 may communicate Internet Protocol (IP) packets or other information between network addresses. The network 101 may include one or more local area networks (LANs); metropolitan area networks (MANs); wide area networks (WANs); a virtual private network (VPN); all or a portion of a global network, such as the Internet; or any other communication system or systems at one or more locations.

The network 101 facilitates communications among various servers (or server systems) 102-104 and various client devices 106-114. Each of the servers 102-104 may be any suitable electronic computing or processing device(s) that can provide computing services including software for one or more client devices 106-114. Each of the servers 102-104 could, for example, include one or more processing devices, one or more memories storing instructions and data, and one or more network interfaces facilitating communication over the network 101. For example, server 102 may provide or manage a platform for collaborative computing, research, or development using grid computing by coordinating volunteer grid computing using the client devices 106-114. Server 103 may be a server assorted with a researcher, software developer, or gaming developer that, as discussed in greater detail below, has projects or tasks that need to be processed by the client devices 106-114 via the platform. The server system 104 is a blockchain network including computing nodes, such as, mining computer systems (or miners) that process transactions for the blockchain as discussed in greater detail below.

Each client device 106-114 represents any suitable electronic computing or processing device that interacts with at least one server or other computing device(s) over the network 101. In this example, the client devices 106-114 include a desktop computer 106, a mobile telephone or smartphone 108, a tablet computer 110, a laptop computer 112, a video game console 114; a set-top box and/or television, etc. However, any other or additional client devices could be used in the networked system 100. For example, any Internet or network connectable device or Internet of Things (IoT) device (e.g., Smart TVs, refrigerators, Raspberry PIs, etc.) could be used for one of the client devices 106-114 in system 100. As discussed below, in various embodiments, client devices 106-114 participate, under the coordination of server 102, to form a volunteer computing grid (possibly along with other computing devices) to process tasks received from the blockchain network 104. As discussed herein, the client devices 106-114 may be considered to be individual cells of the computing grid. Moreover, individual cells can communicate with each other or a server directly or indirectly using, for example, a peer to peer, ad hoc, and/or mesh-based networks with or without a centralized server.

In various embodiments, the servers (e.g., server 102) in connection with the client devices 106-114 form a computing grid for processing of computer tasks. In various embodiments, the server 102 administers custom code for the coordination, provision, and tracking of tasks received from the blockchain network 104 and cells of the computing grid. In other embodiments, the server 102 administers a virtual private network (VPN) connecting the cells within the computing grid to perform the tasks. In these embodiments, commercially available software may be run by the computing grid to perform the computing tasks.

Although FIG. 1 illustrates one example of a networked system 100, various changes may be made to FIG. 1. For example, the system 100 could include any number of each component in any suitable arrangement and each of servers 102-104 and client devices 106-114 may be representative of any number of servers and/or client devices that are part of system 100. For example, functions of the server 102 may be performed by computers in the blockchain network 104 or the client devices 106-114 may receive tasks directly from the blockchain network 104 without administration by the server 102. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
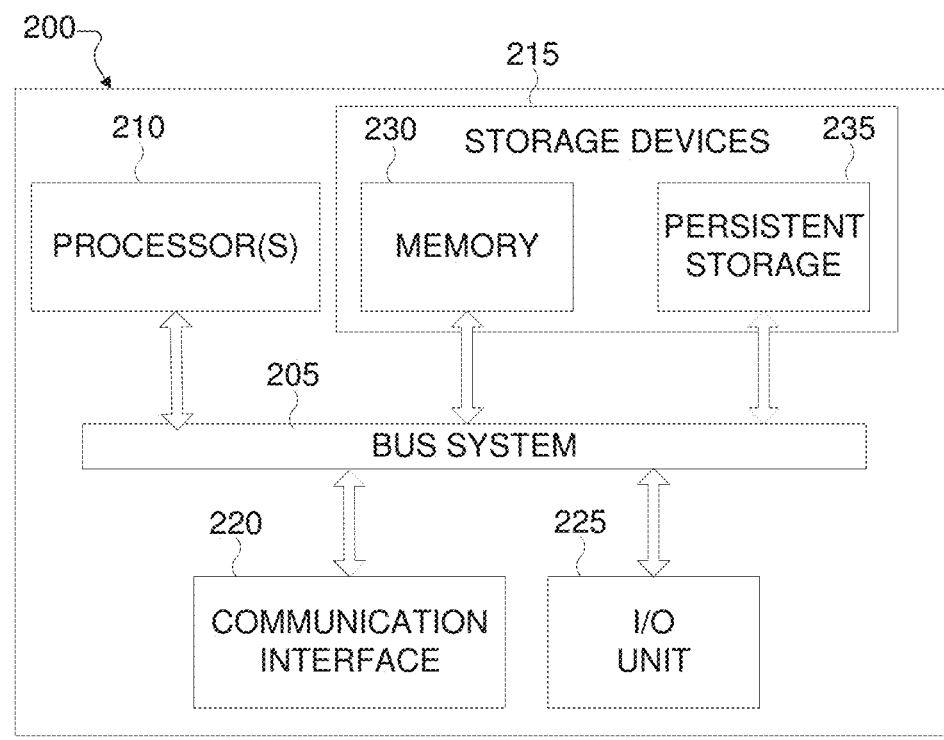
FIG. 2 illustrates an example of a server in which various embodiments of the present disclosure may be implemented.
Figure 3:
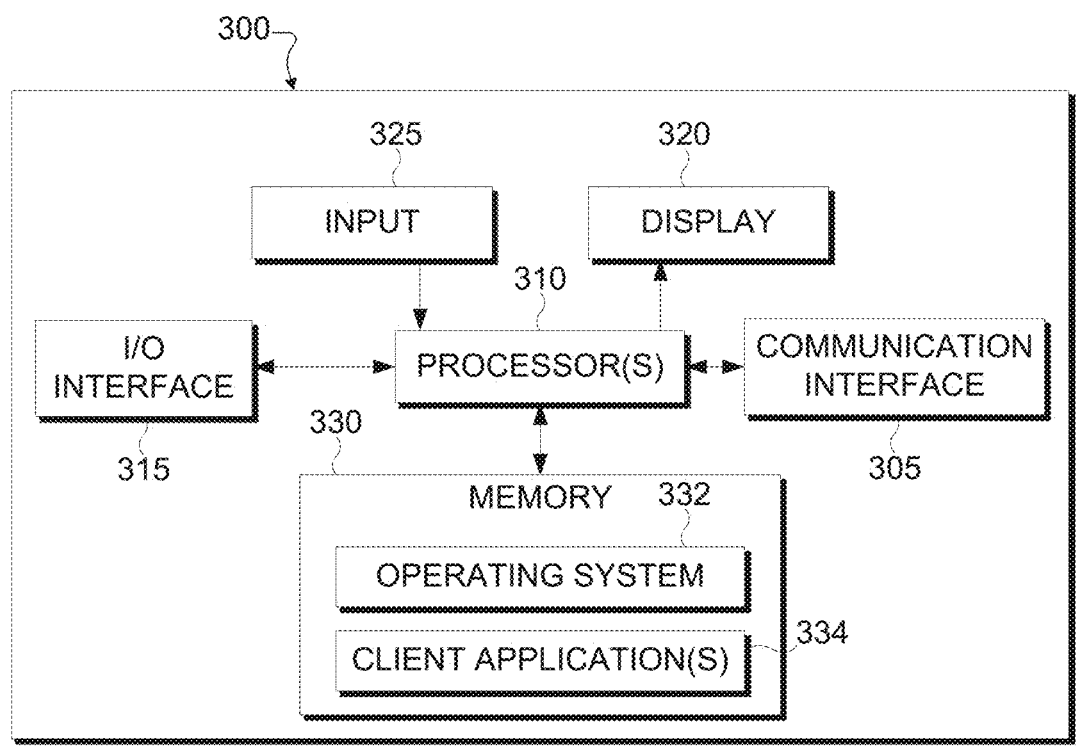
FIG. 3 illustrates an example of a client device in which various embodiments of the present disclosure may be implemented.

FIGS. 2 and 3 illustrate example computing devices in a networked system according to various embodiments of the present disclosure. In particular, FIG. 2 illustrates an example of server 200, and FIG. 3 illustrates an example client device 300. In this illustrative example, the server 200 represents any one of the servers 102-104 including any of the computing nodes or miners in the blockchain network 104 in FIG. 1, and the client device 300 could represent one or more of the client devices 106-114 in FIG. 1.

As shown in FIG. 2, the server 200 includes a bus system 205, which supports communication between processor(s) 210, storage devices 215, a communication interface (or circuit) 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a read-only memory, hard drive, Flash memory, or optical disc. For example, persistent storage 235 may store one or more databases of data, a blockchain including tasks to be performed and records of completed tasks, client applications for cells in a volunteer computing grid, tasks awaiting dispatch to cells in volunteer computing grid, and/or processing results from a volunteer computing grid, etc.

The communication interface 220 supports communications with other systems or devices. For example, the communication interface 220 could include a network interface card or a wireless transceiver facilitating communications over the network 101. The communication interface 220 may support communications through any suitable physical or wireless communication link(s). The I/O unit 225 allows for input and output of data. For example, the I/O unit 225 may provide a connection for user input through a keyboard, mouse, keypad, touchscreen, or other suitable input devices. The I/O unit 225 may also send output to a display, printer, or other suitable output devices.

Although FIG. 2 illustrates one example of a server 200, various changes may be made to FIG. 2. For example, various components in FIG. 2 could be combined, further subdivided, or omitted and additional components could be added according to particular needs. As a particular example, while depicted as one system, the server 200 may include multiple server systems that may be remotely located. In another example, different server systems may provide some or all of the processing, storage, and/or communication resources for administering the dispatch and return results for tasks to and from a blockchain network and/or forming a computing node or miner in the blockchain network in accordance with various embodiments of the present disclosure. In another example, the server 200 may be part of the volunteer computing grid. For example, one or more computing devices within the volunteer computing grid may include software for individually or jointly performing the actions of the server 200 as discussed herein.

FIG. 3 illustrates an example client device 300 according to embodiments of the present disclosure. The embodiment of the client device 300 illustrated in FIG. 3 is for illustration only, and the client devices 106-114 of FIG. 1 could have the same or similar configuration. However, client devices come in a wide variety of configurations, and FIG. 3 does not limit the scope of this disclosure to any particular implementation of an electronic device. As shown in FIG. 3, the client device 300 includes a communication interface (or circuit) 305, processor(s) 310, an input/output (I/O) interface 315, an input 325, a display 320, and a memory 330. The memory 330 includes an operating system (OS) 332 and one or more client applications 334.

The communication interface or circuit 305 supports communications with other systems or devices. For example, the communication interface 305 could include a network interface card or a wireless transceiver facilitating communications over the network 101. The communication interface 305 may support communications through any suitable physical or wireless communication link(s). For embodiments utilizing wireless communication, the communication interface 305 may receive an incoming RF signal via one or more antennas using a variety of wireless communication protocols, (e.g., Bluetooth, Wi-Fi, cellular, LTE communication protocols etc.).

The processor(s) 310 can include one or more processors or other processing devices and execute the OS 332 stored in the memory 330 in order to control the overall operation of the client device 300. The processor(s) 310 is also capable of executing client application(s) 334 resident in the memory 330, such as, program code for one or more client applications for performing computing tasks, such as, for example, processing or computational tasks, communication or network tasks, and storage tasks that are received from a blockchain network as part of a volunteer computing grid. The client application(s) 334 may include program code for machine learning applications or interactive applications, such as video games or applications requiring, using, or incentivizing user input, as discussed in greater detail below. The processor(s) 310, communication interface 305 and/or memory 330 constitute the computing resources of the client device 300. The processor(s) 310 may include any suitable number(s) and type(s) of processors or other devices in any suitable arrangement. Example types of processor(s) 310 include microprocessors, microcontrollers, graphical processing units (GPUs), digital signal processors, field programmable gate arrays, application specific integrated circuits, and discrete circuitry.

The processor(s) 310 can move data into or out of the memory 330 as required by an executing process. The processor(s) 310 is also coupled to the I/O interface 315, which provides the client device 300 with the ability to connect to other devices, such as laptop computers and handheld computers. The I/O interface 315 provides a communication path between accessories and the processor(s) 310.

The processor(s) 310 is also coupled to the input 325 and the display 320. The operator of the client device 300 can use the input 325 to enter data and inputs into the client device 300. For example, the input 325 may be a touchscreen, button, keyboard, trackball, mouse, stylus, electronic pen, video game controller, etc. The display 320 may be a liquid crystal display, light emitting diode display, or other display capable of rendering text and/or at least limited graphics, such as from websites. The memory 330 is coupled to the processor(s) 310. Part of the memory 330 could include a random-access memory (RAM), and another part of the memory 330 could include a Flash memory or other read-only memory (ROM).

Although FIG. 3 illustrates one example of client device 300, various changes may be made to FIG. 3. For example, various components in FIG. 3 could be combined, further subdivided, or omitted and additional components could be added according to particular needs. As a particular example, the processor(s) 310 could be divided into multiple processors, such as one or more central processing units (CPUs) and one or more graphics processing units (GPUs). In another example, the display 320 may be externally connected to or not a part of the client device 300, such as for example, with a video game console or desktop computer.

Figure 4:
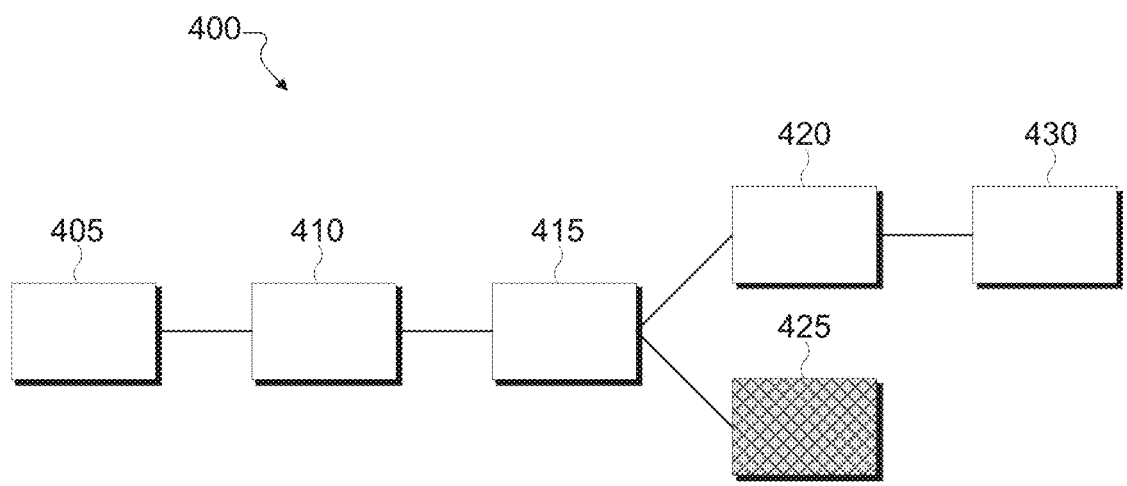
FIG. 4 illustrates a diagram for an example of a blockchain in which various embodiments of the present disclosure may be implemented.

FIG. 4 illustrates a diagram for an example of a blockchain 400 in which various embodiments of the present disclosure may be implemented. In general, blockchains are formed and administered in a wide variety of configurations, and FIG. 4 does not limit the scope of this disclosure to any particular configuration.

The blocks 405-430 form blocks in the blockchain that start with block 405 and end with block 430. For example, the blocks 405-430 or records may include transactional data or programs. For example, each block typically will include a block ID, a hash for cryptography, a timestamp, as well as some data (e.g., transaction record, application, program code, etc.). In various embodiments, as discussed in greater detail below, various of the blocks include program code for requesting completion of tasks and/or results from completed tasks. For example, the blocks may include records indicating tokens, such as cryptocurrency or utility tokens, as credits for successful completion of tasks.

As depicted, blocks 405-420 and 430 are part of the main blockchain 400 a copy of which is maintained at each of the miners. In order for a new block to be added to the blockchain 400, the miners must reach a consensus. For any block in the blockchain 400, there is only one path. Because the blockchain 400 is distributed, the blocks are typically created in short intervals of time. If completion blocks are proposed to be added by different miners, a fork occurs, such as, after block 415. When a fork occurs, miners build from whichever block is received first in time.

To administer the blockchain 400, the miners seek to compute transactions for coin (e.g., mining). In various embodiments, these miners store program code for tasks dispatched to client devices and receive results from the completion of the task. Miners take these results from task completion to build a block. For example, the miners combine results from tasks to creating a block to add to the chain to record that the tasks were done, and which client devices receive credit (e.g., in the form of cryptocurrency or utility tokens) for completion of those tasks.

In various embodiments, those needing task completion by the computing grid, and in particular, for those types of tasks for which user input or interaction can assist in the completion of the tasks post the tasks for completion via the blockchain 400. For example, the server 102 may add blocks including program code for instructing completion of the task to the blockchain 400. In some embodiments, the server 102 may also generate an interactive application that can be used to perform the tasks and pull the tasks from the blockchain either upon user request or approval or without the user intervention or request. For example, the task may be created to be one of one or more tasks that can be played or completed as part of a game that is specific to completion of the task(s) or just a part of an overall larger game. For example, in various embodiments of the present disclosure, the game used may be a human computation game (HCG) or a human-based computation (HBC) game. The client devices in the computing grid (i.e., any of client devices 106-114) request tasks from the blockchain 400 via the platform. As one non-limiting example, for a task requiring image analysis to find a particular object in images, the request is made by grid computing consumer requesting performance of the task to the blockchain. In this example, the block includes a block ID and code for requesting object in the images to be identified.

In various embodiments, the task is connected to an interactive application or game such that the client devices can process or present the task for completion during an interactive application or game running on the client device. When received by the client from the blockchain, the requested task causes the client device to run the task via the block ID. For example, the server 102 may maintain a database of tasks in the blockchain needing to be performed as well as associated requirements of the task. The client devices can view the various tasks stored within the blockchain to identify particular tasks that can be completed by the client device. For example, the task may be programmed for completion in a particular game that the client device has or runs. In another example, client devices may select the task to be performed based on user selection of a particular game or task, the amount of compensation available for task completion or complexity for task completion, or the amount and type of computing resources needed to complete the task. Additionally, the same task can be retrieved by any of the client devices within the grid via the platform. Once the client device finishes processing the task (e.g., including receiving inputs from the user to complete the task), the client device generates results from the task and submits the result to back to the blockchain for validation by the miners. For example, the miners try to form blocks using the received results. Importantly, because the task is made available for completion by all the client devices in the grid, there will likely be several results that are received by different miners. With all the different received results, the miners can develop a consensus about similar or same results for the miners to validate the correct result or results so that the associated client devices that submitted those result(s) (e.g., the one who completed the task correctly and the fastest) and the miner(s) adding the result block to the chain receive credit for successful completion of the task. For example, the miners use a consensus algorithm that looks at how similar results are to each other or some standard from previous processing of the task.

For example, in various embodiments, the consensus algorithm incorporates user inputs to process the consensus algorithm. In other words, user participation is utilized and/or incentivized to perform the consensus determination or supplying the validation. For example, the task may be for the creation of training data, e.g., for a first set of users to draw where the user thinks an object is located in an image. Then, the consensus algorithm would incorporate a different set of users that confirm whether the user performing the task in-fact correctly identified the object (or location of the object) in the image. For example, if there are enough users that confirm the object was correctly identified/located in the image, the consensus algorithm validates that the answer is true (i.e., the result for the task is correct/the task has been completed). As a result, instead of just using users for distributed computing (e.g., via client devices 300), these embodiments use the users at that distributed computing for validation. In these embodiments, a traditional computing task (e.g., consensus voting) is replaced or augmented with human intuition, as humans may be better than computers at certain tasks such as object recognition and location, for example. Additionally, while individual user responses may be unreliable or include some bias, using the platform for collaborative computing significant numbers of user inputs can be used to supply the validation which provides greater reliability. For example, a number of these user validation results may be averaged to form the consensus determination.

Accordingly, various embodiments of the present disclosure provide for the distribution of human computing tasks via a blockchain network. In one example, this human computing task is the actual task in the block to be completed. For example, the computational task distributed via the blockchain network is replaced or augmented with human computation-based tasks, for example using a smart contract. In other words, these blocks can include a human computation based smart contract. In another example, the human computing task is included in the consensus algorithm, which may in-turn be a set of smart contracts executed for supplying an individual input regarding whether the primary task was completed successfully.

For example, the blockchain has consensus built in for a number of users to have to verify a block for the block to be approved to be on the chain. This verification process can be implemented by a smart contract that had dependencies that could require one computation or human computation task to be added to chain, then create another smart contract to take the blocks created and use those as inputs to compile a complete of final results which is a combination of other computed blocks. In some embodiments, the user performing the consensus task could be the miner for the blockchain. Just as a miner on the blockchain is suggesting a hash value to see if the hash value works, in these embodiments that hash value is replaced with a human computation task, which is temporarily added to blockchain until the task has received enough validation from human validators. In some embodiments, these user performed tasks can make up both parts, the actual hash value creation (e.g., the miner) and the hash value validation.

In these embodiments, the inclusion of a human input-based consensus algorithm may be useful to detect or account for human introduced bias, such as thought or emotion, e.g., recognizing that humans may be better than at detecting whether other humans performed the original computational task correctly.

Figure 5:
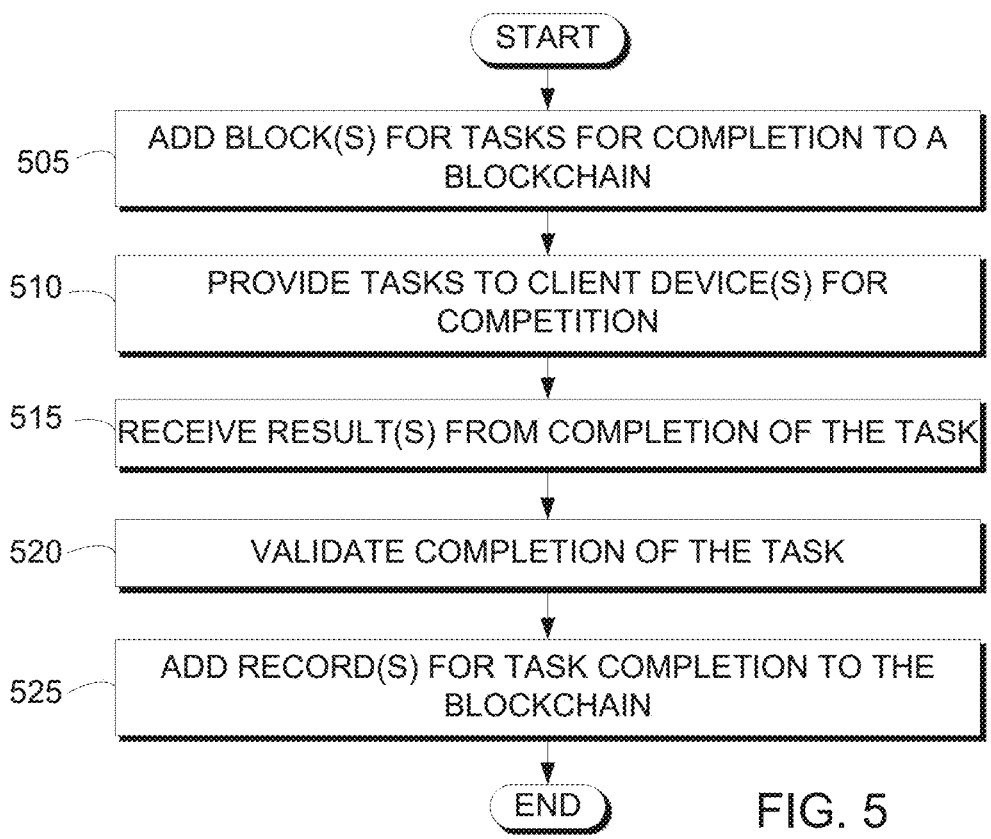
FIG. 5 illustrates a flowchart of a process for dispatching and validating tasks using a blockchain network in accordance with various embodiments of the present disclosure.

FIG. 5 illustrates a process for dispatching and validating tasks using a blockchain network in accordance with various embodiments of the present disclosure. For example, the process depicted in FIG. 5 is described as implemented by the server 200 in FIG. 2; the process may also be implemented by any of the server systems 102-104 in FIG. 1, and different servers systems may perform any number or portion of the steps of the process, collectively referred to herein as the system.

The process begins with the system adding block(s) for tasks for completion to the blockchain (step 505). For example, in this process, the system may be a system for providing a collaborative computing platform that provides information to and from the blockchain network. In another example, the system may be a miner or node in the blockchain network that generates and adds the blocks to the block chain to add the task for completion and assists in task validation and consensus. In another example, the system may implement some combination of the two aforementioned roles. In step 505, the system may add records for the various computing tasks to be completed to the blockchain. In various embodiments, the tasks are not just any type of software but rather are custom tasks that need or utilize user input or human intuition, for example, in connection with machine learning to improve or optimize machine learning applications, for example, as part of HBC. As used herein, machine learning is the use of statistical techniques to build a model using inputs to iteratively and progressively improve the processing of a task. As used herein, example machine learning applications include, without limitation, data science, analytics, informatics, artificial intelligence (AI), and data mining applications. For example, these tasks provided via the blockchain can be performed using interactive applications to generate training data for machine learning algorithms, such as deep neural networks; evaluate decisions, such as supervised learning; provide mutation on solutions; and/or other additional heuristic processes provided or aided by human intuition. Additional examples of use of results from human performed tasks in connection with machine learning algorithms are described in U.S. patent application Ser. No. 16/365,647 filed Mar. 26, 2019 and titled "Abstracted Interface for Gamification of Machine Learning Algorithms," which is incorporated herein by reference.

As part of step 505, the system may receive and/or generate the tasks from one or more entities needing tasks involving user inputs such as, for example, researchers, software developers, etc. To generate the block, the system may generate and include information for the block including block ID, timestamp as well as data for the block including, for example, program code for instructing performance of the task. This program code may include pointers (e.g., URLs/URIs or references to code in an interactive application), components of the interactive application needing the user inputs (e.g., media, pointers to media, as well as instructions for completion) or may include the program code for installing and executing the entire interactive application as well as the components needing the user inputs. For example, the block may include information indicating the interactive application to be used to complete the task, criteria for completion of the task, and compensation for completion of the task. Completion of the task may require receipt of the user inputs via the interactive application. As a result, the client devices can access and run/process these tasks, e.g., via the interactive application, directly upon receipt from the blockchain.

The block may also include a smart contract linking payment to the successful completion of the task. For example, the smart contract may identify a payer and amount (e.g., for both task completion and miner processing), for example, with reference to one or more prior transactional blocks in the chain that record crypto tokens of the payer in the amount for completion of the task, as well as criteria for completion of the task for the miners to utilize in determining whether the task has been completed. In these embodiments, the computational task distributed via the blockchain network are replaced or augmented with human computation-based tasks, for example using a smart contract. In other words, these blocks can include a human computation based smart contract.

Thereafter, the system provides tasks to client device(s) for completion (step 510). Here, the system uses the blockchain to distribute the task for completion by one or more of the client devices (e.g., client devices 106-114 in network 100). In one example, as part of step 510, the client device(s) may request the task and the system may send the task via the platform.

The system then receives the result(s) from the completion of the task from the client device(s) (step 515). For example, as part of step 515, the client device(s) that completed the task sends the results from the task to the system. The system or other miners may receive multiple such results from different client devices that completed the task.

Thereafter, the system validates completion of the task (step 520). For example, in step 520, the system (or group of miners) may have received the results in the form of new records to be added to the blockchain and attempt to validate the record based on the criteria associated with the task. For example, the criteria associated with the task includes the actions to be performed, timing, quantity, and/or quality of the results of the task performance. The miners may validate the record based on the record indicating or including data for completion of the task. Additionally, the server 200 (or a group of miners) may validate the record based on timing or result quality. For example, the first to perform (or first N number to perform, for example, for tasks associated with generating a training data set), those finished before a certain time, or results of a certain level of consistency with results of others performing the task may be validated.

In these embodiments, the data for the validated results can be used by server 200 or provided for use of the user inputs in processing at least part of a machine learning application. In one example, the server 200 may receive multiple inputs to use for machine learning. For example, the server 200 receives all the results of each instance of a client device completing the task (e.g., whether or not the task completion was validated). In another example, multiple instances of the same or a similar task may be added to the block for multiple results on completion of the same or similar task to use for machine learning.

As part of this step, the system may send the data associated with the results of processing the task to a set of the client devices 106-114 for validation of completion of the task. For example, the system may request input from multiple users to develop a consensus or the use of human intuition in the consensus algorithm. The system receives the user inputs from the responding the client devices, respectively, as to whether the task was completed and makes a consensus determination as to whether the task was completed based on the received set of user inputs. For example, the system may average the user inputs or look for some threshold number or percentage of approvals from the responding client devices to develop the consensus.

Based on a certain level of consensus for the received record, the system (or group of miners) then adds the record(s) to the blockchain (step 525). For example, in step 525, the record may convey some form of value, e.g., in the form of cryptocurrency or utility tokens, to the client device from which the record was received, e.g., the added record or new block may indicate an amount of compensation to an account associated with the client devices that successfully completed the task. Additionally, the added record or new block may indicate an amount of compensation to the miner or nodes in the blockchain network that processed completion of the task. For example, the associated miner creating the record executes the smart contract and the ID for the client device that completed the task is recorded in the block as having the crypto tokens for completion. Additionally, the miner is incentivized (to validate, add the record, and execute the smart contract) with crypto tokens for this processing that are received, for example, as part of executing the smart contract.

Figure 6:
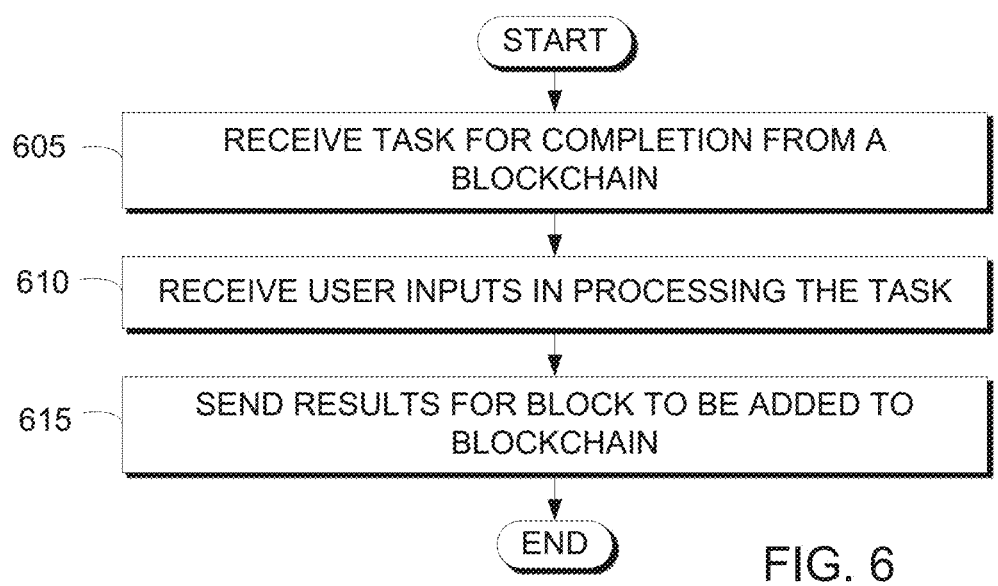
FIG. 6 illustrates a flowchart of a process for processes for receiving and completing tasks using a blockchain network in accordance with various embodiments of the present disclosure.

FIG. 6 illustrates a process for receiving and completing tasks using a blockchain network in accordance with various embodiments of the present disclosure. For example, the process depicted in FIG. 6 is described as implemented by the client device 300 in FIG. 3. The process may also be implemented by any of the client devices 106-114 in FIG. 1.

The process begins with the client device 300 receiving a task for completion from a blockchain (step 610). For example, in step 610, the client device pulls the task based on a block ID into an interactive application for completion. In some embodiments, the client device may receive a list of computational tasks (e.g., from server 102) or determine the type of tasks that can be completed based on, for example, user interest, type of games usable for task completion, and/or availability of needed computing resources at the client device. The client device may then present the list of tasks for user selection or may pull the tasks into the game without user intervention, for example, if the task can be completed as part of routine gameplay. In these embodiments, the client device receives the task based on the data stored in the block such as, for example, a task identifier (block ID, task ID, URL, URI, etc.) to pull data from an external database to run, program code such as an executable code to download and install or run a user interface for performing the task or larger interactive application via which the task can be processed, or the entire user interface or interactive application to install or run.

Thereafter, the client device 300 receives user inputs in processing the task (step 610). For example, in step 610, the client device 300 generates a user interface (e.g., as part of a game) to solicit user inputs and/or human intuition to generate results in the form of data from performance for the task. For example, this data may include generated training data or data indicative of pattern recognition. In various embodiments, the tasks are not just any type of computation but rather are custom tasks that need or utilize user input or human intuition, for example, in connection with machine learning to improve or optimize machine learning applications. For example, these tasks processed at the client device 300 are performed using interactive applications to generate training data for machine learning algorithms, such as deep neural networks; evaluate decisions, such as supervised learning; provide mutation on solutions; and/or other additional heuristic processes provided or aided by human intuition.

Thereafter, the client device 300 sends results from processing the task for a block to be added to the blockchain (step 615). For example, in step 615, the client device 300 generates and formats the results from the task completion and sends data indicative of the results to a server, such as for example, server 102. The client device 300 or the server 102 may format and include the results data to form a proposed block for the blockchain. The client device 300 sends the result data for a block to be added to the blockchain to receive independently validated credit for completion of the task as discussed above. Thereafter, if validated (as discussed above), the client device and the associated user receives credit for completion of the task in the form of crypto tokens.

Although FIGS. 5 and 6 illustrate examples of processes for dispatching and validating tasks using a blockchain network and receiving and completing tasks using a blockchain network, respectively, various changes could be made to FIGS. 5 and 6. For example, while shown as a series of steps, various steps in each figure could overlap, occur in parallel, occur in a different order, or occur multiple times. In another example, steps may be omitted or replaced by other steps.

Accordingly, various embodiments of the present disclosure provide for the inclusion, distribution, completion, validation, and/or compensation of computational tasks that utilize user inputs and/or human intuition within a blockchain environment. Those entities that need completion such tasks can utilize the reliability, availability, anonymity, and security of the blockchain distribution mechanisms disclosed herein to access the user inputs and/or human intuition needed for their task's completion. Moreover, users are enabled with additional opportunities to monetize their computing and intuition via the reliability, availability, anonymity, and security of the blockchain distribution mechanisms disclosed herein. As a result, embodiments of the present disclosure provide for the distribution, completion, validation, and/or compensation of tasks in a manner secure reliable manner that can be free from fraud, downtime, or interference from outside parties.

One embodiment provides a method for distributing tasks using a blockchain network. The method includes generating a task for completion via an interactive application and distributing, using the blockchain network, the task via a block in a blockchain associated with the blockchain network. The blockchain network includes a plurality of nodes and accessible by a plurality of client devices associated with the interactive application. The method further includes receiving, from one or more of the client devices via one or more of the nodes in the blockchain network, data associated with results of processing the task via the interactive application. Completion of the task is validated based on the received data.

Another embodiment provides a system for distributing tasks using a blockchain network. The system includes a processor configured to generate a task for completion via an interactive application and distribute, using the blockchain network, the task via a block in a blockchain associated with the blockchain network. The blockchain network includes a plurality of nodes and accessible by a plurality of client devices associated with the interactive application. The system further includes a communication interface operably connected to the processor. The communication interface is configured to receive, from one or more of the client devices via one or more of the nodes in the blockchain network, data associated with results of processing the task via the interactive application. Completion of the task is validated based on the received data.

Another embodiment provides a non-transitory, computer-readable medium for distributing tasks using a blockchain network is provided. The non-transitory, computer-readable medium includes program code that, when executed by a processor of a system, causes the system to generate a task for completion via an interactive application and distribute, using the blockchain network, the task via a block in a blockchain associated with the blockchain network. The blockchain network includes a plurality of nodes and accessible by a plurality of client devices associated with the interactive application. The non-transitory, computer-readable medium includes program code that, when executed by a processor of a system, causes the system to receive, from one or more of the client devices via one or more of the nodes in the blockchain network, data associated with results of processing the task via the interactive application. Completion of the task is validated based on the received data.

In any of the above examples and embodiments, the results are associated with user inputs received during processing of the task via the interactive application at one or more client devices connected to the blockchain network.

In any of the above examples and embodiments, completion of the task requires receipt of the user inputs via the interactive application, the method further comprising processing at least part of a machine learning application using the data associated with the results of the received user inputs.

In any of the above examples and embodiments, the block includes information indicating the interactive application to be used to complete the task, criteria for completion of the task, and compensation for completion of the task.

In any of the above examples and embodiments, the method further includes the steps of validating completion of the task including receiving a set of user inputs from a set of the client devices, respectively, as to whether the task was completed; and making a consensus determination as to whether the task was completed based on the received set of user inputs.

In any of the above examples and embodiments, validating completion of the task further comprises sending, prior to receiving the set of user inputs, the data associated with the results of processing the task to the set of client devices for validation of completion of the task.

In any of the above examples and embodiments, the method further includes the steps of in response to validating completion of the task, adding a new block to the blockchain, the new block indicating compensation to one of the nodes in the blockchain network that processed completion of the task and an account associated with one of the client devices connected to the blockchain network that completed the task.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "such as," when used among terms, means that the latter recited term(s) is(are) example(s) and not limitation(s) of the earlier recited term. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory, computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases. Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of the patented subject matter is defined only by the claims. Moreover, none of the claims is intended to invoke 35 U.S.C. § 112(f) unless the exact words "means for" are followed by a participle.

What is claimed is:

1. A method for distributing tasks using a blockchain network, the method comprising:
    generating a task for completion via an interactive application;
    distributing, using the blockchain network, the task via a block in a blockchain associated with the blockchain network, the blockchain network including a plurality of nodes and accessible by a plurality of client devices associated with the interactive application, wherein the block includes information indicating the interactive application to be used to complete the task and criteria for completion of the task;
    receiving, from one or more of the client devices via one or more of the nodes in the blockchain network, data associated with results of processing the task via the interactive application; and
    in response to receiving the data associated with the results of processing the task via the interactive application, validating completion of the task including:
        receiving a set of user inputs from a set of the client devices, respectively, as to whether the task was completed, wherein the set of user inputs as to whether the task was completed are based on the criteria for completion of the task via the interactive application; and
        generating a consensus determination as to whether the task was completed based on the received set of user inputs.

2. The method of claim 1, wherein:
    the results are associated with user inputs received during processing of the task via the interactive application at one or more client devices connected to the blockchain network, and
    the interactive application is a video game and the task is for completion during game play of the video game and the block includes information indicating data to include in the video game.

3. The method of claim 1, wherein completion of the task requires receipt of user inputs via the interactive application, the method further comprising processing at least part of a machine learning application using the data associated with the results of the received user inputs.

4. The method of claim 1, wherein:
    the block further includes information indicating compensation for completion of the task, and
    the method further comprises, in response to validating completion of the task, adding a new block to the blockchain, the new block indicating the compensation to one of the nodes in the blockchain network that processed completion of the task and an account associated with one of the client devices connected to the blockchain network that completed the task.

5. The method of claim 1, wherein:
    the task indicated in the block in the blockchain is to generate training data for machine learning algorithms, perform a machine learning task, or provide mutation on solutions, and
    validating completion of the task further comprises sending, prior to receiving the set of user inputs, the data associated with the results of processing the task to the set of client devices for validation of completion of the task.

6. A system for distributing tasks using a blockchain network, the system comprising:
    a processor configured to:
        generate a task for completion via an interactive application; and
        distribute, using the blockchain network, the task via a block in a blockchain associated with the blockchain network, the blockchain network including a plurality of nodes and accessible by a plurality of client devices associated with the interactive application, wherein the block includes information indicating the interactive application to be used to complete the task and criteria for completion of the task; and
    a communication interface operably connected to the processor, the communication interface configured to receive, from one or more of the client devices via one or more of the nodes in the blockchain network, data associated with results of processing the task via the interactive application,
    wherein the processor is further configured to, in response to receipt of the data associated with the results of processing the task via the interactive application, validate completion of the task including to:
        receive, via the communication interface, a set of user inputs from a set of the client devices, respectively, as to whether the task was completed, wherein the set of user inputs as to whether the task was completed are based on the criteria for completion of the task via the interactive application; and
        generate a consensus determination as to whether the task was completed based on the received set of user inputs.

7. The system of claim 6, wherein:
    the results are associated with user inputs received during processing of the task via the interactive application at one or more client devices connected to the blockchain network, and
    the interactive application is a video game and the task is for completion during game play of the video game and the block includes information indicating data to include in the video game.

8. The system of claim 6, wherein:
    completion of the task requires receipt of user inputs via the interactive application, and
    the processor is further configured to process at least part of a machine learning application using the data associated with the results of the received user inputs.

9. The system of claim 6, wherein:
    the block further includes information indicating compensation for completion of the task,
    the processor is further configured to add, in response to validating completion of the task, a new block to the blockchain, and
    the new block indicates the compensation to one of the nodes in the blockchain network that processed completion of the task and an account associated with one of the client devices connected to the blockchain network that completed the task.

10. The system of claim 6, wherein:
the task indicated in the block in the blockchain is to generate training data for machine learning algorithms, perform a machine learning task, or provide mutation on solutions, and
the communication interface is configured to send, prior to receiving the set of user inputs, the data associated with the results of processing the task to the set of client devices for validation of completion of the task.

11. A non-transitory, computer-readable medium for distributing tasks using a blockchain network comprising program code that, when executed by a processor of a system, causes the system to:
generate a task for completion via an interactive application;
distribute, using the blockchain network, the task via a block in a blockchain associated with the blockchain network, the blockchain network including a plurality of nodes and accessible by a plurality of client devices associated with the interactive application, wherein the block includes information indicating the interactive application to be used to complete the task and criteria for completion of the task;
receive, from one or more of the client devices via one or more of the nodes in the blockchain network, data associated with results of processing the task via the interactive application; and
in response to receiving the data associated with the results of processing the task via the interactive application, validate completion of the task including to:
receive a set of user inputs from a set of the client devices, respectively, as to whether the task was completed, wherein the set of user inputs as to whether the task was completed are based on the criteria for completion of the task via the interactive application; and
generate a consensus determination as to whether the task was completed based on the received set of user inputs.

12. The computer-readable medium of claim 11, wherein:
the results are associated with user inputs received during processing of the task via the interactive application at one or more client devices connected to the blockchain network, and
the interactive application is a video game and the task is for completion during game play of the video game and the block includes information indicating data to include in the video game.

13. The computer-readable medium of claim 11, wherein:
completion of the task requires receipt of user inputs via the interactive application, and
the computer-readable medium further comprises program code that, when executed by the processor of the system, causes the system to process at least part of a machine learning application using the data associated with the results of the received user inputs.

14. The computer-readable medium of claim 11, wherein:
the block further includes information indicating compensation for completion of the task, and
the computer-readable medium further comprises program code that, when executed by the processor of the system, causes the system to add a new block to the blockchain, the new block indicating the compensation to one of the nodes in the blockchain network that processed completion of the task and an account associated with one of the client devices connected to the blockchain network that completed the task.

15. The computer-readable medium of claim 11, wherein:
the task indicated in the block in the blockchain is to generate training data for machine learning algorithms, perform a machine learning task, or provide mutation on solutions, and
the computer-readable medium further comprises program code that, when executed by the processor of the system, causes the system to send, prior to receiving the set of user inputs, the data associated with the results of processing the task to the set of client devices for validation of completion of the task.

16. A non-transitory, computer-readable medium for processing tasks via a blockchain network comprising program code that, when executed by a processor of a client device, causes the client device to:
receive, via a block in the blockchain network, a task for completion via an interactive application of the client device, wherein the block includes information indicating the interactive application to use to complete the task and criteria for completion of the task;
identify, from the block, and generate, for display, information indicating the interactive application to use to complete the task and the criteria for completion of the task;
generate, via a user interface for the interactive application, a request for user inputs associated with processing of the task at the client device;
send data associated with results of processing the task via the interactive application; and
in response to identification of completion of another task:
receive data associated with completion of the other task;
request user input as to whether the other task was completed based on the received data; and
send, based on the user input, information indicating whether the other task was completed for validating completion of the other task.

17. The computer-readable medium of claim 16, wherein:
the interactive application is a video game;
the task is for completion during game play of the video game; and
the computer-readable medium further comprises program code that, when executed by the processor of the client device, causes the client device to identify, from the block, data to include in the video game and include the data in the video game during the game play.

18. The computer-readable medium of claim 16, wherein:
the block further includes information indicating compensation for completion of the task; and
the computer-readable medium further comprises program code that, when executed by the processor of the client device, causes the client device to identify, after processing of the task at the client device, a new block in the blockchain indicating the compensation for an account associated with the client device.

19. The computer-readable medium of claim 16, wherein:
wherein criteria for completion of the other task is indicated in another block in the blockchain for distributing the other task; and
the computer-readable medium further comprises program code that, when executed by the processor of the client device, causes the client device to:
identify the criteria for completion of the other task from the other block; and generate, for display prior to the request for the user input as to whether the other task was completed, information indicating the criteria for completion of the other task and the data associated with completion of the other task.

20. The computer-readable medium of claim 15, wherein the task indicated in the block in the blockchain is to generate training data for machine learning algorithms, perform a machine learning task, or provide mutation on solutions.

\* \* \* \* \*